United States Patent
Vigderman et al.

(10) Patent No.: US 11,306,240 B2
(45) Date of Patent: *Apr. 19, 2022

(54) FRAC FLUIDS FOR FAR FIELD DIVERSION

(71) Applicant: BJ Energy Solutions, LLC, Houston, TX (US)

(72) Inventors: Leonid Vigderman, Baytown, TX (US); Lingjuan Shen, Tomball, TX (US); Diankui Fu, Houston, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,848

(22) Filed: Aug. 25, 2020

(65) Prior Publication Data

US 2021/0062069 A1 Mar. 4, 2021

Related U.S. Application Data

(63) Continuation of application No. 16/111,407, filed on Aug. 24, 2018, now abandoned.

(Continued)

(51) Int. Cl.
 *C09K 8/80* (2006.01)
 *E21B 43/267* (2006.01)
 (Continued)

(52) U.S. Cl.
 CPC .............. *C09K 8/66* (2013.01); *C09K 8/70* (2013.01); *C09K 8/80* (2013.01); *E21B 43/267* (2013.01); *C09K 2208/10* (2013.01)

(58) Field of Classification Search
 CPC .......... E21B 43/267; C09K 8/66; C09K 8/70; C09K 8/80; C09K 2208/10; C09K 2208/18
 See application file for complete search history.

(56) References Cited

U.S. PATENT DOCUMENTS 3,998,272 A * 12/1976 Maly .................. C09K 8/76
 166/295
6,059,034 A * 5/2000 Rickards .............. C09K 8/80
 166/310

(Continued)

FOREIGN PATENT DOCUMENTS

WO 2017/213657 A1 12/2017
WO WO-2018017110 A1 * 1/2018 .............. C09K 8/62

OTHER PUBLICATIONS

Baker Hughes Incorporated, *LiteProp Ultralightweight Proppant for Sand Control* (May 2017).

(Continued)

*Primary Examiner* — Angela M DiTrani Leff
(74) *Attorney, Agent, or Firm* — Womble Bond Dickinson (US) LLP

(57) ABSTRACT

Aqueous well treatment fluids especially suited for use in far field diversion in low viscosity carrier fluids comprise water, a friction reducer, and a diverter. The diverter comprises dissolvable particulates and proppants. The dissolvable particulates have a specific gravity of from about 0.9 to about 1.6 and a particle size of about 50 mesh or less. The proppants have a specific gravity of from about 0.9 to about 1.4 and a particle size of from about 20 to about 100 mesh. The dissolvable particulates have a higher specific gravity and a smaller particle size than the proppant.

22 Claims, 3 Drawing Sheets

Related U.S. Application Data

(60) Provisional application No. 62/717,335, filed on Aug. 10, 2018.

(51) Int. Cl.
*C09K 8/66* (2006.01)
*C09K 8/70* (2006.01)

(56) References Cited

U.S. PATENT DOCUMENTS

| | | | | |
|---|---|---|---|---|
| 6,330,916 | B1* | 12/2001 | Rickards | C09K 8/80 |
| | | | | 507/924 |
| 6,364,018 | B1* | 4/2002 | Brannon | E21B 43/267 |
| | | | | 507/924 |
| 7,237,610 | B1* | 7/2007 | Saini | C09K 8/64 |
| | | | | 166/279 |
| 7,322,411 | B2 | 1/2008 | Brannon et al. | |
| 7,581,590 | B2* | 9/2009 | Lesko | C09K 8/665 |
| | | | | 166/280.1 |
| 7,803,740 | B2 | 9/2010 | Bicerano et al. | |
| 8,899,332 | B2 | 12/2014 | Brannon et al. | |
| 9,010,424 | B2* | 4/2015 | Agrawal | C09K 8/80 |
| | | | | 166/280.2 |
| 9,034,802 | B2 | 5/2015 | Ahrenst et al. | |
| 9,580,642 | B2 | 2/2017 | Brannon et al. | |
| 9,816,365 | B2* | 11/2017 | Nguyen | C09K 8/68 |
| 9,919,966 | B2 | 3/2018 | Gupta | |
| 9,920,610 | B2 | 3/2018 | Nelson et al. | |
| 9,938,811 | B2* | 4/2018 | Bestaoui-Spurr | C09K 8/516 |
| 10,240,449 | B1* | 3/2019 | Scanlan | C09K 8/68 |
| 2006/0157243 | A1* | 7/2006 | Nguyen | E21B 43/267 |
| | | | | 507/224 |
| 2006/0175059 | A1* | 8/2006 | Sinclair | C09K 8/805 |
| | | | | 166/283 |
| 2007/0289743 | A1 | 12/2007 | Willberg et al. | |
| 2011/0005761 | A1* | 1/2011 | Luo | C09K 8/035 |
| | | | | 166/305.1 |
| 2012/0024530 | A1* | 2/2012 | Todd | C09K 8/03 |
| | | | | 166/308.1 |
| 2012/0157356 | A1 | 6/2012 | Dawson et al. | |
| 2013/0096037 | A1* | 4/2013 | Bicerano | C09K 8/035 |
| | | | | 507/216 |
| 2013/0244912 | A1* | 9/2013 | Hughes | C09K 8/92 |
| | | | | 507/202 |
| 2013/0306317 | A1* | 11/2013 | Karadkar | C09K 8/514 |
| | | | | 166/305.1 |
| 2013/0341030 | A1 | 12/2013 | Brannon et al. | |
| 2014/0116702 | A1 | 5/2014 | Tang | |
| 2014/0352959 | A1 | 12/2014 | Nelson et al. | |
| 2015/0041132 | A1* | 2/2015 | Nelson | C09K 8/516 |
| | | | | 166/305.1 |
| 2015/0233226 | A1* | 8/2015 | Holzhauser | E21B 43/267 |
| | | | | 166/280.1 |
| 2016/0177693 | A1 | 6/2016 | Gomaa et al. | |
| 2016/0298437 | A1 | 10/2016 | Mendell | |
| 2017/0051599 | A1 | 2/2017 | Bestaoui-Spurr et al. | |
| 2017/0081585 | A1 | 3/2017 | Bestaoui-Spurr et al. | |
| 2017/0121589 | A1 | 5/2017 | Reddy et al. | |
| 2017/0144330 | A1 | 5/2017 | Ortega Andrade et al. | |
| 2017/0175484 | A1 | 6/2017 | Sewell | |
| 2018/0187538 | A1 | 7/2018 | Walters et al. | |
| 2018/0306014 | A1* | 10/2018 | Nguyen | C09K 8/685 |
| 2020/0056090 | A1* | 2/2020 | Nguyen | C09K 8/68 |

OTHER PUBLICATIONS

Baker Hughes Incorporated, *MM-Acid-Real Connect Service* (Mar. 2016).
Baker Hughes Incorporated, *Real Connect Service* (Dec. 2014).
BJ Services, *ThinFrac™ MP Improve the Efficiency of Slickwater Fracturing Operations* (Copyright 2017).
Gomaa, A. et al., *Engineering Solid Particulate Diverter to Control Fracture Complexity: Experimental Study* (SPE-179144-MS) (2016).
Rodionov, Y. et al., *Optimization of Infill Well Development Using a Novel Far-Field Diversion Technique in the Eagle Ford Shale* (URTeC: 2670497) (Jul. 24, 2017).
Spurr, N., et al., *Far-Field Diversion Agent Using a Combination of a Soluble Particle Diverter with Specially Engineered Proppant* (SPE-181851-MS) (Aug. 24, 2016).
Sun Specialty Products, *Fracblack HT® High Conductivity Ultr-Lightweight Proppant* (undated).
Sun Specialty Products, *Sun FracBlak HT™ ULW Proppant for Enhanced Placement & Conductivity* (Jan. 2017).
Sun Specialty Products, *Sun Omniprop™ High Conductivity Ultr-Lightweight Proppant* (undated).
Williams, V. et al., *Far-Field Diversion in Hydraulic Fracturing and Acid Fracturing: Using Solid Particulates to Improve Stimulation Efficiency*, (SPE-181845-MS) (2016).

* cited by examiner

Test Fluids

| Fluid No. | Dissolvable Particulate | DP Size (mesh) | DP SG | Proppant | Prop. Size (mesh) | Prop. SG | DP:P (by weight) | Diverter Loading (ppa) | Surfactant | Surf. Loading (gpt) |
|---|---|---|---|---|---|---|---|---|---|---|
| 1 | PLA | 100 | 1.2 | LiteProp 108 | 30/80 | 1.054 | 40:60 | 0.5 | 1 | 1 |
| 2 | PLA | 100 | 1.2 | LiteProp 108 | 30/80 | 1.054 | 40:60 | 2 | 1 | 1 |
| 3 | PLA | 70 | 1.2 | LiteProp 108 | 30/80 | 1.054 | 40:60 | 2 | 1 | 1 |
| 4 | PLA | 50 | 1.2 | LiteProp 108 | 30/80 | 1.054 | 40:60 | 2 | 1 | 1 |
| 5 | PLA | 100 | 1.2 | LiteProp 108 | 30/80 | 1.054 | 20:80 | 2 | 1 | 1 |
| 6 | PLA | 100 | 1.2 | LiteProp 108 | 30/80 | 1.054 | 60:40 | 2 | 1 | 1 |
| 7 | PLA | 100 | 1.2 | LiteProp 108 | 30/80 | 1.054 | 100:0 | 2 | 1 | 1 |
| 8 | - | - | - | Sand | 100 | 2.65 | 0:100 | 2 | 1 | 1 |
| 9 | PLA | 100 | 1.2 | LiteProp 108 | 30/80 | 1.054 | 40:60 | 2 | 2 | 1 |
| 10 | PLA | 100 | 1.2 | LiteProp 108 | 30/80 | 1.054 | 40:60 | 2 | 3 | 1 |
| 11 | PLA | 100 | 1.2 | LiteProp 108 | 30/80 | 1.054 | 40:60 | 1 | 1 | 1 |
| 12 | - | - | - | Sand | 100 | 2.65 | 0:100 | 4.7 | - | - |

FIG. 2

FRAC FLUIDS FOR FAR FIELD DIVERSION

FIELD OF THE INVENTION

The present invention relates to fluids used in oil and gas well fracturing operations and, more particularly, to low viscosity frac fluids that may be used for far field diversion.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer, and thus, the porous layer forms an area or reservoir in which hydrocarbons will collect. A well is drilled through the earth until the hydrocarbon bearing formation is reached. Hydrocarbons then can flow from the porous formation into the well.

A modern oil well typically includes a number of tubes telescoped wholly or partially within other tubes. That is, a well is first drilled to a certain depth. Larger diameter pipes, or casings, are placed in the well and cemented in place to prevent the sides of the borehole from caving in. After the initial section has been drilled, cased, and cemented, drilling will proceed with a somewhat smaller well bore. The smaller bore is lined with somewhat smaller pipes or "liners." The liner is suspended from the original or "host" casing by an anchor or "hanger." A well may include a series of smaller liners, and may extend for many thousands of feet, commonly up to and over 25,000 feet.

Many oil and gas bearing geological formations, such as sandstone, are very porous. Hydrocarbons are able to flow easily from the formation into a well. Other formations, however, such as shale, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations.

In general, such techniques share the dual goals of (a) increasing the surface area of the formation exposed to the well, and (b) increasing the conductivity of fluids through the formation. That is, they increase the number and size of hydrocarbon flow paths through the formation and enhance the ability of fluid to flow easily through the flow paths. They may be applied to relatively porous formations, but are critical for economic recovery of hydrocarbons from minimally porous formations such as shale and other so-called "unconventional" formations.

Perhaps the most important stimulation technique is the combination of horizontal well bores and hydraulic fracturing. A well will be drilled vertically until it approaches a formation. The bore then will be drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid into the well at high pressure and flow rates. Fluid is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the well bore.

At a certain point, the initial "pad" of fluid will create and enlarge fractures to the point where proppants are added to the fluid. Proppants are solid particulates, such as grains of sand, which are carried into the fractures by the fluid. They serve to prevent the fractures from closing after pumping is stopped. The proppant typically will be added in increasing concentration as the formation continues to accept fluid and fracturing continues.

In any event, when the desired degree of fracturing has been achieved, pumping is stopped, and the well is "shut in." That is, valves at the surface are closed, and fluid is held in the well. As the well is shut in, the formation begins to relax, and fractures tend to close on the entrained proppant. Depending on the formation and the operation, the well may be shut in for a few minutes or hours. Eventually the surface valves will be opened to allow the fluid to "clean out" of the fractures. That is, fluid will flow out of the formation, leaving proppant packed fractures that will provide additional flow paths for produced hydrocarbons.

Early fracturing fluids were oil-based fluids consisting of gelled hydrocarbons, such a napalm. Given the safety and environmental concerns with such fluids, however, the industry relatively quickly moved to water-based fluids. Hydrocarbon-based fluids using liquefied natural gas (LNG) and liquefied petroleum gas (LPG) still may be useful for water-sensitive formations, such as those with high clay content. Energized fluids, which contain relatively small amounts of water and large fractions of gas, also are used in water-sensitive formations. Less commonly, water-based systems incorporating a viscoelastic surfactant (VES) are used.

The most common frac fluids, however, are one of three types of water-based fluids: linear or uncrosslinked fluids, crosslinked fluids, and "slickwater" fluids. Water may comprise up to 99% by weight (wt %) of the liquid phase or even higher in slickwater fluids. They may include various additives, such as buffers, clay inhibitors, corrosion inhibitors, surfactants, and biocides, to address issues specific to particular formations. There are no hard and fast definitions, but in general the three most common water-based fluids are distinguished by their primary components and the manner in which they are designed to facilitate the fracturing process.

Linear or uncrosslinked fluids are composed primarily of water and a gelling agent. Guar is the most common gelling agent. Other galactomannan gums and their derivatives, however, are used as well, such as hydroxypropyl guar (HPG), carboxymethyl guar (CMG), and carboxymethyl hydroxypropyl guar (CMHPG). Cellulosic gelling agents, such as hydroxyethyl cellulose (HEC) and carboxymethyl hydroxyethyl cellulose (CMHEC), also have also been used as gelling agents.

Linear fluids contain relatively high loadings of gelling agent to provide a viscous, more gel-like fluid. Guar, for example, typically is loaded in amounts ranging from about 20 to about 60 pounds per 1,000 gallons of base fluid (ppt). Although they may be lower, the viscosity of linear fluids more commonly is at least 25 centipoise (cP).

Crosslinked fluids are composed primarily of water, a gelling agent, and a crosslinking agent. As with linear fluids, the most common gelling agent is guar. HPG also is commonly used in crosslinked fluids. As their name implies, crosslinkers create links between the polymers of the gelling agent, increasing their effective molecular weight and increasing the viscosity imparted to the fluid.

Crosslinked fluids, therefore, generally can provide viscosities equivalent to linear fluids with lower amounts of gelling agent. Alternately, crosslinkers can provide higher viscosities at equivalent loadings when, for example, it may be necessary to suspend larger, heavier proppants. Guar, for example, typically is loaded at rates from 20 to 35 ppt in crosslinked fluids.

As compared to slickwater fluids, gelled fluids, whether linear or crosslinked, typically can accept higher loadings of proppant because they are so viscous. From 4 to 12 pounds of proppant is commonly added to each gallon of base fluid. Given their higher viscosities, proppant tends to be suspended in the fluid instead of dropping out. It will tend to be carried through the fracture network relatively efficiently, thus ensuring that the fractures will remain open once pumping is stopped.

Because they are so viscous, however, gelled fluids tend to enlarge and lengthen the initial, primary fractures instead of creating secondary and tertiary fractures leading from the primary fractures. Thus, the fracture network tends to have fewer, wider fractures. If the formation is minimally permeable or "tight," such as many shale formations, hydrocarbons still may have difficulty in reaching the fractures.

In contrast to gelled fluids, slickwater fluids have much lower viscosities. They are composed primarily of water and low concentrations of a friction reducer. The most common friction reducers are long chain, high molecular weight polyacrylamide derivatives and copolymers. Because they are not so viscous, slickwater fluids tend to create a more dendritic fracture pattern, patterns with more, smaller, more widely distributed secondary, tertiary, and higher-order fractures. The difference in fracture patterns might be roughly visualized as the difference between dead tree branches (gelled fluids) and fractured safety glass (slickwater).

Slickwater fluids, however, are not very efficient in delivering proppant into fractures. The fluid is lighter and less viscous as compared to gelled fluids. More fluid is needed to carry the same amount of proppant. It also must be pumped into the formation at higher rates to minimize the tendency of proppant to settle. Pumping rates typically are at least 60 US oil barrels per minute (bbl/min), with rates of 100 bbl/min being common, Gelled fluids, in contrast, typically are pumped at rates of 20 to 40 bbl/min.

Regardless of the fluid used, however, there are additional challenges in producing an optimal fracture pattern. Formations are rarely homogeneous throughout a hydrocarbon bearing reservoir. Because of a combination of permeability, pre-existing fault lines, and other differences in the geology of a formation, certain areas along a well bore and certain portions of the reservoir are more receptive and responsive to the introduction of frac fluids. Regardless of the type chosen, fluid will flow preferentially into the more receptive areas. Absent intervention, the more receptive fractures will continue to accept fluid and enlarge at the expense of creating additional fractures and more complex fracture patterns.

Moreover, and especially in older fields, wells may be drilled in close proximity. Several bores may be drilled from a single site or "pad," with their horizontal extensions radiating at various angles away from the pad or at different depths. Even when drilled from seemingly distant pads, longer and longer horizontal extensions can bring wells into close proximity. Additional wells can increase the amount and efficiency of production from a field. Fracture fluids from a new well, however, may tend to flow preferentially into depleted portions of a reservoir. Production from any resulting fractures will be less productive simply because there is less hydrocarbon left in the formation. It also is important that fractures created in a new well not extend into a neighboring well. Such "frac hits" can interfere significantly with production in the neighbor well.

Thus, various techniques have been developed to limit fracture growth and thereby to reduce the likelihood of frac hits, avoid depleted portions of a reservoir, and increase fracture complexity in productive portions of a reservoir. For example, the neighbor well may be pressurized to reduce the likelihood that fractures created in a new well will reach the neighbor well. Pressurizing the neighbor well, however, necessarily interrupts production flow from the original well and requires equipment and operations at both the original well and the new well.

So-called "diverter" materials also have been used. Diverters are particulates that are added to a frac fluid. in contrast to proppants, which are designed to support a fracture and allow production fluids to flow through the fracture, diverters are designed to plug a fracture. The diverter particulates will be carried preferentially into the more receptive fractures, plugging them and stopping their growth. Fluid will be diverted to otherwise less receptive fractures, or to create additional fractures in more resistant portions of the formation.

Diverters have been used commonly in "near field" diversion. Near field diverters are designed to flow into and plug the most receptive primary fractures leading from the borehole. The plugs will be formed at or near the bore interface, typically within a radius of about 10 feet. Thus, near field diversion can help to avoid frac hits by stopping the growth of a primary fracture before it reaches a neighboring well. It will be appreciated, however, that near field diverters serve primarily to encourage the formation of additional primary fractures. Necessarily, they also stop the formation and growth of secondary and tertiary fractures in the plugged primary fracture.

"Far field" diverters also have been used to plug fractures at a distance from the bore, including at or near the tip of fractures. When delivered to the tip, diverters will form a plug that stops growth of the fracture and avoids frac hits. Such plugs also will encourage secondary and tertiary fracturing. Far field diverters also may be designed to plug secondary fractures, thereby encouraging additional secondary and tertiary fractures.

Dissolvable particulates have been used as diverters in both near field and far filed applications. They are designed to plug a fracture and then, after a period of time, to dissolve, thereby eliminating the plug. Non-dissolvable particulates also have been used as far field diverters. Both dissolvable and non-dissolvable particulates can effectively minimize frac hits if they are delivered to the tip of fracture. They will plug the tip and prevent its further growth.

If they form plugs remote from the tip, however, production from the fracture extending beyond the plug may be impaired. Plugs formed by non-dissolvable particles will remain in place. They will block the flow of fluids that otherwise would be produced from the distal portion of the fracture. Even if the plug is dissolvable, however, the distal portion of the fracture will lack proppant. Once the particles dissolve, the fracture will relax. It may close completely, but in any event, flow through the fracture will be restricted.

Other diverter materials have been devised that utilize a mixture of dissolvable particulates and non-dissolvable proppants. Such systems are broadly disclosed, for example, in U.S. Pat. No. 9,938,811 to N. Bestaoui-Spurr et al.

Bestaoui-Spurr teaches that the diverter mixture can include any conventional proppant. Certain dissolvable particulates are indicated as preferable, but in general Bestaoui-Spurr teaches that any dissolvable particulates may be used. The mixture of dissolvable particulates and non-dissolvable proppant theoretically are able to form plugs in more receptive fractures and to divert fluid into less receptive fractures and portions of the formation. After the diverter has dissolved, however, proppant will remain in place to support the fracture and allow the flow of production fluids.

The systems disclosed in Bestaoui-Spurr are designed primarily for near field diversion, but also are disclosed as being useful for plugging secondary fractures to encourage additional secondary and tertiary fractures. When the mix is used for far field diversion, Bestaoui-Spurr teaches that the size of the dissolvable particulates should be somewhat larger than the proppant. The dissolvable particulates are disclosed as being from about 4 to about 50 mesh (roughly 4.76 to 0.297 mm) while the proppant is from about 40 to about 325 mesh (roughly 0.420 to 0.044 mm). The mix also comprises dissolvable particulates that are somewhat less dense than the proppant: apparent density preferably from about 1.2 to about 1.75 g/cc for the dissolvable particulates vs. from about 1.05 to about 3.7 specific gravity for the proppant. Most preferably, however, the proppant has an apparent specific gravity of greater than 2.6, much greater than the preferred density of the dissolvable particulates.

Transporting diverters into near field fractures is rarely an issue. Flow rates usually are sufficient to carry particulates into the near reaches of primary fractures regardless of the viscosity of the fluid. Fractures may extend for hundreds of feet, however, and the flow of fluid slows considerably as it extends further into a formation. Thus, transporting particulates into the far field is more problematic. That is especially true of low viscosity, slickwater fluids.

Because of their low viscosity, particulates will settle out of slickwater fluids more rapidly than gelled fluids. They are less likely to be transported throughout the entire fracture network. Instead of relying on gelling agents to suspend particulates, slickwater fluids depend on higher flow rates and volumes to transport lower loadings of particulates. The cost of additional pumping capacity, and of acquiring and treating more water, however, can be significant. It is important, therefore, to not only ensure that particulates are placed properly, but also to minimize the added cost of higher flow rates and volumes by ensuring that particulates are transported as efficiently as possible.

The statements in this section are intended to provide background information related to the invention disclosed and claimed herein. Such information may or may not constitute prior art. It also will be appreciated that the economics and characteristics of a particular well may render it more suitable to a particular fracturing operation and fluid over another. A particular fluid may provide extraordinary results in one well and be completely unsuitable for use in another. Thus, general statements should be taken as such, and not as definitive, immutable principles.

Nevertheless, and despite the added cost of obtaining, pumping, and treating more water, slickwater fluids have been used widely and are viewed by many as superior fluids for fracturing many formations. Their tendency to create more complex fracture patterns can significantly improve production. There remains, however, a need for new and improved diverter materials that may be used in slickwater frac fluids. Such disadvantages and others inherent in the prior art are addressed by various aspects and embodiments of the subject invention.

SUMMARY OF THE INVENTION

The subject invention, in its various aspects and embodiments, relates generally to fluids used in oil and gas well fracturing operations, and especially to low viscosity fluids that may be used in far field diversion. The invention encompasses various embodiments and aspects, some of which are specifically described and illustrated herein. One aspect of the invention provides for aqueous well treatment fluids comprising water, a friction reducer, and a diverter. The diverter comprises dissolvable particulates and proppants. The dissolvable particulates have a specific gravity of from about 0.9 to about 1.6 and a particle size of about 50 mesh or less. The proppants have a specific gravity of from about 0.9 to about 1.4 and a particle size of from about 20 to about 100 mesh. The dissolvable particulates have a higher specific gravity and a smaller particle size than the proppant.

Other embodiments of the novel fluids comprise dissolvable particulates having a specific gravity of from about 1 to about 1.4 or from about 1.2 to about 1.3. In yet other embodiments the dissolvable particulates have a particle size of about 100 mesh or less.

Additional embodiments of the novel fluids comprise proppants having a specific gravity of from about 1 to about 1.1. In other embodiments the proppants have a particle size of from about 30 mesh to about 80 mesh.

Still other embodiments of the novel fluids comprise diverters where the ratio of the specific gravity of the dissolvable particulates to the specific gravity of the proppant is from about 1 to about 1.6 or from about 1 to about 1.3.

Further embodiments of the novel fluids comprise diverters where the ratio of the maximum particle size of the proppant to that of the dissolvable particulates is from about 1.5 to about 8 or from about 2 to about 6.

Yet other embodiments of the novel fluids comprise diverters where the ratio of the dissolvable particulates to the proppants by weight is from about 90:10 to about 10:90, or from about 80:20 to about 20:80, or from about 60:40 to about 40:60.

Additional embodiment of the novel fluids comprise diverter loaded in amounts of from about 0.1 to about 10 ppa, or from about 0.2 to about 5 ppa, or from about 0.5 to about 2 ppa.

Other embodiments of the novel fluids comprise dissolvable particulates composed of polylactic acid.

Further embodiments of the novel fluids comprise proppants composed of thermoset polymer beads having nano-fillers.

Still other embodiments of the novel fluids comprise fluids where the friction reducer is selected from the group consisting of polyacrylamides and derivatives, copolymers, and mixtures thereof.

Yet other embodiments of the novel fluids have a viscosity of about 12 cps or less of a viscosity of about 8 cps or less.

Other aspects and embodiments of the invention provide methods of fracturing a subterranean formation in a well. The method comprises providing an aqueous carrier fluid. A diverter is added to the carrier fluid. The diverter comprises dissolvable particulates and proppant. The dissolvable particulates have a specific gravity of from about 0.9 to about 1.6 and a particle size of about 50 mesh or less. The proppants have a specific gravity of from about 0.9 to about 1.4 and a particle size of from about 20 to about 100 mesh. The dissolvable particulates have a higher specific gravity and a smaller particle size than the proppant. The carrier fluid with the diverter then is pumped into the formation.

Finally, still other aspect and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

BRIEF DESCRIPTION OF THE DRAWINGS

FIG. 2 is a table showing the composition of the test fluids evaluated in the examples.

Figure 1A:
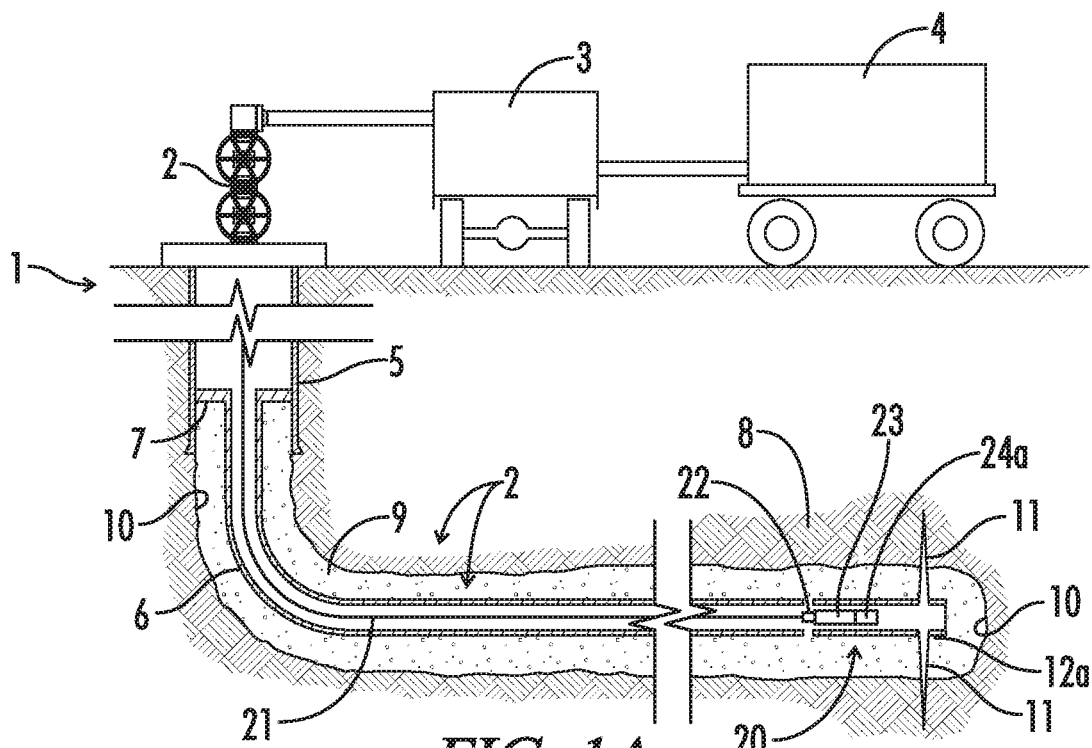
FIG. 1A (prior art) is a schematic illustration of an early stage of a "plug and perf" fracturing operation showing a tool string 20 deployed into a liner assembly 6, where tool string 20 includes a perf gun 22, a setting tool 23, and a frac plug 24.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to fluids used to fracture oil and gas wells, and especially to low viscosity frac fluids incorporating novel diverter materials suitable for far field diversion. Various specific embodiments will be described below. For the sake of conciseness, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

It will be appreciated that when specifying ranges, such as the loadings, sizes, and specific gravities of particulates incorporated into the novel diverting materials, such ranges are intended to describe each value in the range and ranges between any two values. For example, if a loading is specified as from about 1 to about 10 ppt, the range describes loadings from about 1 to about 9 ppt, from about 1 to about 8 ppt, from about 2 to about 10 ppt, from about 3 to about 10 ppt, from about 4 to about 7 ppt, and so forth. Similarly, if the loading is specified as less than or more than a particular loading, it describes inclusive specific ranges of loadings. Likewise, when compositions are described in this disclosure as a group consisting of named compositions, the group may consist of and be claimed as any set or subset of named compositions.

Various components of preferred fluids are polymers. It will be appreciated that in accordance with that aspect of the disclosure, the term "copolymer," as used herein, is not limited to polymers comprising two types of monomeric units, but is meant to include any combination of monomeric units, e.g., terpolymers, tetrapolymers, and the like.

Many materials listed as being suitable for use in the invention, such as friction reducers, surfactants, and various conventional additives, can be used in their dry or unadulterated form. When sold commercially for use in aqueous frac fluids, however, they almost always are in liquid form with water as the primary solvent. They also may include their own additives to improve solubility or stability, or may include co-solvents such as isopropyl alcohol, glycerin, propylene glycol and others. When specifying the loading of components, where possible, reference will be made to the loading of "pure" components, that is, the active ingredients in the liquid formulation. In many cases, however, formulations are proprietary, and the concentration of active ingredient in the formulation may not be known. In such cases, loadings will be specified in terms of the formulation and not necessarily the active ingredient.

The novel fracturing fluids may be used in a wide variety of formations, but are particularly useful for shale formations. Even for a particular type of formation, however, there are many approaches to fracturing wells. Typically, however, a well will be fractured in many different locations along the well bore during multiple fracturing stages. Different systems also will be used to deliver fluids into a formation. The novel fluids in general may be used in any such conventional methods and systems.

For example, "plug and perf" is a very common method of fracturing a well. An overview of a plug and perf operation is illustrated schematically in FIG. 1. As shown therein, well 1 is serviced by a well head 2, pumps 3, mixing/blending units 4, and various surface equipment (not shown). As described further below, mixing/blending units 4 will be used to prepare the novel fracturing fluids. Pumps 3 will be used to introduce the fracturing fluids into the well at high pressures and flow rates. Other surface equipment will be used to introduce tools into the well and to facilitate other completion and production operations.

The upper portion of well 1 is provided with a casing 5 which extends to the surface. A production liner 6 has been installed in the lower portion of casing 5 via a liner hanger 7. It will be noted that the lower part of well 1 extends generally horizontally through a hydrocarbon bearing formation 8 and that liner 6, as installed in well 1, is not provided with valves or any openings in the walls thereof. Liner 6 also has been cemented in place. That is, cement 9 has been introduced into the annular space between liner 6 and the well bore 10.

Figure 1B:
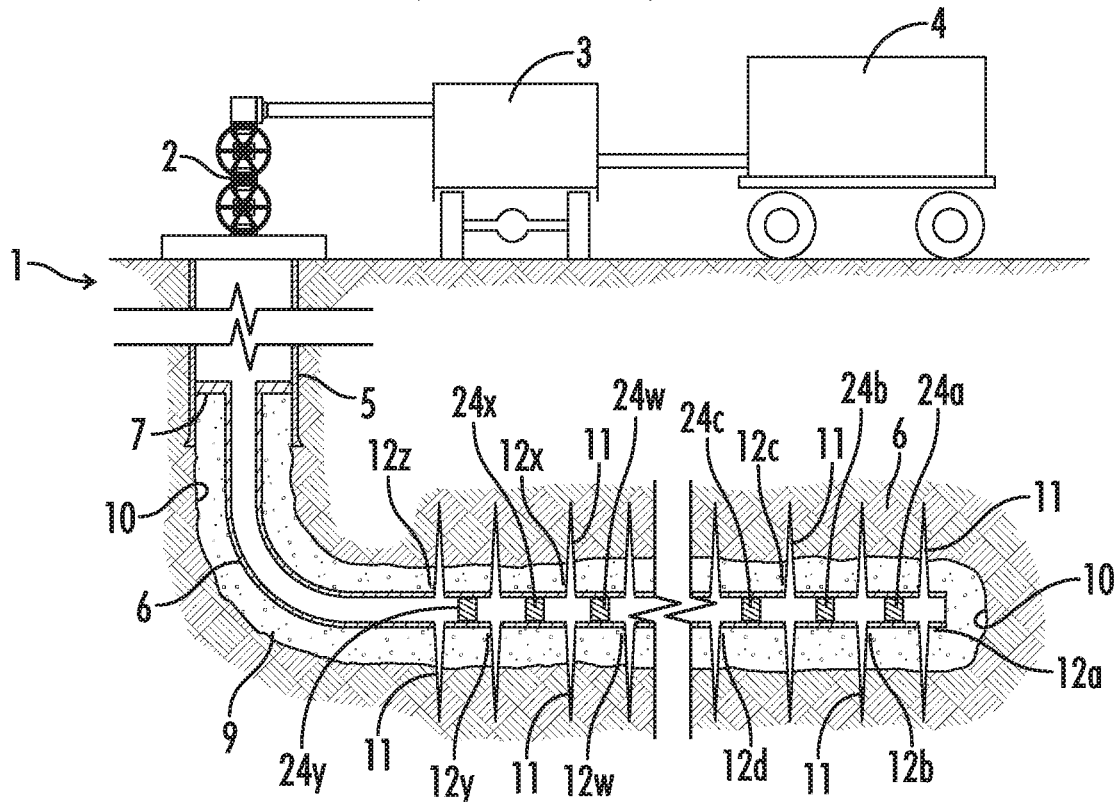
FIG. 1B (prior art) is a schematic illustration of liner assembly 6 after completion of the plug and perf fracturing operation, but before removal of plugs 24 from liner 6.

FIG. 1A shows well 1 after the initial stage of a frac job has been completed. A typical frac job will proceed from the lowermost zone in a well to the uppermost zone. FIG. 1A, therefore, shows that the bottom portion of liner 6 has been perforated and that fractures 11 extending from perforations 12a have been created in a first zone near the bottom of well 1. Tool string 20 has been run into liner 6 on a wireline 21.

Tool string 20 comprises a perf gun 22, a setting tool 23, and a frac plug 24a. Tool string 20 is positioned in liner 6 such that frac plug 24a is uphole from perforations 12a. Frac plug 24a is coupled to setting tool 23 and will be installed in liner 6 by actuating setting tool 23. Once plug 24a has been installed, setting tool 23 will be released from plug 24a. Perf gun 22 then will be fired to create perforations 12b in liner 6 uphole from plug 24a. Perf gun 22 and setting tool 23 then will be pulled out of well 1 by wireline 21.

A frac ball (not shown) then will be deployed onto plug 24a to restrict the downward flow of fluids through plug 24a. Plug 24a, therefore, will substantially isolate the lower portion of well 1 and the first fractures 11 extending from perforations 12a. Fluid then can be pumped into liner 6 and forced out through perforations 12b to create fractures 11 in a second zone. After fractures 11 have been sufficiently developed, pumping is stopped and valves in well head 2 will be closed to shut in the well. After a period of time, fluid will be allowed to flow out of fractures 11, though liner 6 and casing 5, to the surface.

Additional plugs 24b to 24y then will be run into well 1 and set, liner 6 will be perforated at perforations 12c to 12z, and well 1 will be fractured in succession as described above until, as shown in FIG. 1B, all stages of the frac job have been completed and fractures 11 have been established in all zones. Once the fracturing operation has been completed, plugs 24 typically will be drilled out and removed from liner 6. Production equipment then will be installed in the well and at the surface to control production from well 1.

It will be noted that the methods and systems for fracturing operations, and for the production of hydrocarbons, are complex and varied. Moreover, FIG. 1 are greatly simplified schematic representations of a plug and perf fracturing operation. The fluid delivery system has been greatly simplified. For example, a single pump 3 is depicted whereas in practice many pumps, perhaps 20 or more, may be used. Many different blenders, mixers, manifolding units, and the like may be used but are not illustrated. Production liner 6 also is shown only in part as such liners may extend for a substantial distance. The portion of liner 6 not shown also will be provided with perforations 12 and plugs 24, and fractures 11 will be established therein. In addition, FIG. 1 depict only a few perforations 12 in each zone, whereas typically a zone will be provided with many perforations. Likewise, a well may be fractured in any number of zones, thus liner 6 may be provided with more or fewer plugs 24 than depicted. It is believed the novel fluids may be used in the context of many known systems and methods for stimulating and producing hydrocarbons from a well. An appropriate system and method may be selected with routine effort by workers in the art. Nevertheless, it is believed the methods and systems described herein will provide an understanding of the broader context in which the novel fluids may be used.

Importantly, it also will be noted that the schematic representation of fractures 11 in FIG. 1 are greatly simplified. While they provide a general sense of the concept and a crude depiction of how primary fractures lead away from the well bore, they are not intended to depict the full complexity and high-order branching that is generally preferred. Actual fracture patterns, as discussed herein, present a much greater challenge than what may be suggested by the figures.

Broader embodiments of the novel fluids comprise a carrier fluid and a diverter material. The carrier fluid is a weakly gelled aqueous fluid, such as slickwater, that comprises a friction reducer. Preferably, the carrier fluids also comprise a surfactant, and it may comprise additional conventional additives. The novel diverter material comprises dissolvable particulates and proppant. As discussed further below, it is believed that the novel fluids will provide more effective far field diversion, especially in that they may more reliably transport diverter material through the far field fracture network to form plugs at or near the tips of growing fractures.

Base Fluid

The base fluid of the novel fracturing fluids primarily serves to fracture the formation and to transport diverter particulates into the fractures. The base fluid is water, and it will be understood that water will include fresh water, produced water, and salt water. "Salt water" as used herein may include unsaturated salt water or saturated salt water "brine systems", such as a NaCl, or KCl brine, as well as heavy brines including $CaCl_2$, $CaBr_2$, and $KCO_2H$.

The base fluid will constitute the vast majority of the carrier fluid, that is, the fracturing fluid before addition of diverter materials. Generally, the base fluid will constitute up to 95 to 99 wt % of the carrier fluid. Depending upon the desired viscosity of the carrier fluid, more or less of the base fluid may be included, as appropriate. One of ordinary skill in the art, with the benefit of this disclosure, will recognize the appropriate amount to use for a chosen application.

Friction Reducer

The friction reducer component primarily serves to lower friction pressure between the treatment fluid and the liner during pumping. Water in turbulent flow has high friction pressure. Friction reducers generally lower friction pressure by increasing laminar flow and decreasing turbulent flow in the water as it is pumped down the liner and into a formation.

Reducing such friction is important, especially in slickwater fluids. The pumping pressure required to fracture a formation depends not only on the physical properties of the formation of the formation and the depth at which it is located, but also on the pressure loss experienced as a fracturing fluid travels through the casing and liners on its way to the formation. Slickwater fluids, as noted, typically are pumped at relatively high rates. The liners also may extend for many thousands of feet. Friction between the fluid and liner is inevitable, and at such flow rates over such distances pressure losses can be significant. By incorporating a friction reducer, however, pressure losses can be reduced, and the same formation may be fractured with less pumping pressure. Lower pumping pressure typically translates into lower cost.

Friction reducers typically are long chain, high molecular weight polymers that are water soluble. Perhaps the most common friction reducers are polyacrylamide and derivatives, copolymers, and mixtures thereof. In various embodiments, however, the friction reducer also may be selected from the group consisting of polymethylmethacrylate, polyethylene oxide, polyAMPS (poly 2-acrylamido-2-methylpropane sulfonic acid), and polymers derived therefrom.

Although often used as gelling agents, guar and other galactomannan gums, mixtures, copolymers, and derivatives thereof, such as hydroxypropyl guar (HPG) and carboxymethyl hydroxypropyl guar (CMHPG) may be used at lower loadings as friction reducers without increasing excessively the viscosity of the fluid.

The friction reducer may be loaded into the base fluid in amounts from about 0.75 to about 15 ppt. Preferably, it may be loaded in amounts from about 1 to about 7.5 ppt. The precise loading of friction reducer for a particular application will be determined by the degree of viscosity and friction reduction required and may be determined by routine effort. For example, the viscosity of the fluid generally is increased by increasing the polymer concentration. Also, when there are higher amounts of dissolved solids in the water, it may be necessary to use higher loadings or a more effective friction reducer to provide a desired degree of friction reduction.

It will be appreciated, however, that the friction reducer may contribute to or enhance other properties of the fracturing fluid. For example, in certain water-sensitive formations such as clay and shale, the friction reducer may help minimize interactions between water and the formation. The friction reducer may tend to encapsulate particles and help to avoid deterioration of the formation walls that might otherwise might create debris that could plug proppant in the fractures. As discussed further below, the friction reducer at least initially also may aid in forming a plug in a fracture.

Surfactant

The novel treatment fluids also preferably comprise a surfactant to help disperse the smaller particulates in the carrier fluid. Suitable surfactants may include conventional, commercially available anionic, cationic, zwitterionic, and amphoteric surfactants. Preferably, the surfactants are non-emulsifying and non-foaming. They usually are sold as proprietary liquid formulations. The surfactant formulations typically will be added in amounts from about 0.5 to about 2 gallons per thousand gallons of base fluid (gpt).

It will also be noted that surfactants, for example those disclosed in U.S. Pat. No. 9,034,802 to A Ahrenst et al., also may enhance the performance of the friction reducer.

Dissolvable Particulates

The dissolvable particulates of the novel diverter material may be composed of conventional dissolvable diverter materials. It also will be understood that dissolvable as used herein in reference to diverter materials will encompass not only compounds that are soluble in water, but also those which may be hydrolyzed, disintegrated, or otherwise degraded in the presence of water. Such compounds, therefore, will include water soluble or degradable polymers, such as polylactic acid (PLA). PLA is preferred because it may be modified to provide a fairly wide range of solubility. In its more amorphous form, it is soluble at lower temperatures. It may be produced from racemic mixtures of lactides, however, to yield varying degrees of crystallinity. As the degree of crystallinity increases, PLA becomes less soluble and will dissolve at acceptable rates only at higher temperatures.

Other polymers, however, may be used, such as polyglycolic acid and polyvinyl alcohol. Other suitable polymers may include aliphatic polyesters, poly(lactide)s, polyglycolides, poly($\varepsilon$-caprolactone)s, poly(hydroxy ester ether)s, poly(hydroxybutyrate)s, poly(anhydride)s, polycarbonates, poly(ortho ether)s, poly(amino acid)s, poly(ethylene oxide)s, polyphosphazenes, polyether esters, polyester amides, polyamides, and copolymers of those polymers. For higher temperature environments, for example, the particles may be made of polyethylene terephthalate.

Suitable diverter particulates also may be composed of non-polymeric organic compounds, such as phthalic anhydride, terephthalic anhydride, phthalic acid, terephthalic acid, and benzoic acid, and inorganic compounds, such as Gilsonite and rock salt, and other materials that dissolve or melt at downhole temperatures. The particles also may include additives, both chemical and physical, that will control the dissolution rate of the primary component of the particle, such a magnesium hydroxide and other alkali metal hydroxides.

The dissolvable diverter particulates may have a more or less spherical shape, such as beads, or a shape that is non-spherical to varying degrees, such ellipsoids, egg or tear-drop shapes, cylindrical pellets, square and other prismatic shapes, and irregular and multifaceted shapes. The particulates also may have a surface that is substantially smooth or that is substantially roughened or irregular. What shape is typical will vary depending on the material and how it is produced. If dissolvable polymers are used, they typically will be produced in a beaded or pelleted shape. Benzoic acid and other non-polymer organic diverters typically will tend to be flaked or irregular shaped. Inorganic compounds typically will have a prismatic shape or multifaceted shape, but may be more or less spherical.

The novel dissolvable particulates will have relatively low densities, that is, a specific gravity of from about 0.9 to about 1.6. Preferably, the dissolvable particulates will have a specific gravity from about 1 to about 1.4, and more preferably, from about 1.2 to about 1.3. It will be appreciated that in referencing the specific density of the dissolvable particles their absolute specific density is intended. That is, the specific gravity values are determined based on the volume of the particles themselves, as opposed to apparent specific gravity, which is determined based on the volume of the particles and any voids present in the particles.

The novel dissolvable particulates will be relatively fine, that is, they will have a particle size of about 50 mesh (US) or less (roughly corresponding to a particle size of about 0.3 mm or less). Preferably, they will have a particle size of less than about 100 mesh (roughly corresponding to a particle size of about 0.15 mm or less).

It will be appreciated, of course, that commercially available particulate products invariably comprise a distribution of particle sizes. Depending on the way in which they are produced, the distribution of sizes may be greater or lesser, both in the range of sizes and the proportion that each size represents. Polymer beads, for example, may have a narrower range of particle sizes as produced. Products produced by grinding or crushing, however, typically have a large distribution of sizes and tend to produce varying quantities of very tiny particles or "fines."

Commercial products suitable for use as dissolvable particulates, however, typically are sold and sized by sifting the particulates through screens having openings of defined sizes. That sizing will substantially eliminate larger sized particles, but particles passing through the screen still will have a range of particle sizes. For example, particulates sold as 50 mesh will have particle sizes from about 0.3 mm or less. A higher mesh size (smaller particle size) may be specified. A 50/100 mesh product thus would comprise in large part particles of from about 0.3 to about 0.15 mm. The particulates, however, still will comprise a range of sizes falling within those limits. It also will be understood that sifting of particulates is not completely effective in sizing particles. Thus, particulates sold as 50/100 mesh generally indicates that 90% or more of the particles will pass through a 50-mesh screen but will be retained by a 100-mesh screen. Some larger particles may remain, but especially on the smaller side, the "sized" particulates still will contain some particles outside of specification.

Proppants

The novel diverter materials comprise a proppant. The proppant particulates primarily serve to support fractures created in a formation and to minimize closing of the fractures after completion of the fracturing operation. They do so by physically resisting the stress present in the fractured formation.

In general, the proppants of the novel diverter material may include any of the ultra-lightweight proppant materials conventionally used in fracturing fluids. As used herein, ultra-lightweight proppants shall be understood as referring to proppants where the particulates have a specific gravity of from about 0.9 to about 1.4. Preferably, the proppant will have a specific gravity of from about 1.0 to about 1.1.

Suitable ultra-lightweight proppants may include thermoset polymer beads having nanofillers. The polymer binder may be crosslinked epoxies, epoxy vinyl esters, polyesters, phenolics, polyurethanes, polyureas, and polyimides. Crosslinked copolymers prepared by the polymerization of vinylic monomers, vinylidene monomers, or mixtures thereof also may be used as the polymer binder. The nanofiller may be nanoscale carbon black, fumed silica and alumina, carbon nanotubes, carbon nanofibers, cellulosic nanofibers, natural and synthetic nanoclays. For example, beads made from terpolymers of styrene, ethyl vinylbenzene, and divinylbenzene, with the weight fraction of divinylbenzene ranging from 3 to 5 wt % of the starting monomer mixture, having carbon black filler in amounts from about 0.1 to 15 wt % may be suitable. Such ultra-lightweight proppants are described in greater detail in the literature, for example, in U.S. Pat. No. 7,803,740 to J. Bicerano et al. They also are commercially available, for example, FracBlack HT™ and OmniProp™ proppants sold by Sun Drilling Products Corp., Bell Chasse, La. (sundrilling.com).

Other suitable ultra-lightweight proppants may include coated lightweight or substantially neutrally buoyant materials. The base material may be ground or crushed nut shells, ground or crushed seed shells, ground or crushed fruit pits, processed wood, or a mixture thereof. Coatings may include phenol formaldehyde, melamine formaldehyde, and urethane resins and mixtures thereof. Such ultra-lightweight proppants are described in greater detail in the literature, for example, in U.S. Pat. No. 6,364,108 to H. Brannon et al.

As with the dissolvable particulates, the proppant particulates may have various shapes. The shape of the proppant particulates will depend primarily on their composition and how they were produced. If the proppant particles are composed of polymers, they may have a beaded or pelleted shape. Organic materials, such as crushed walnut and other nut shells typically will have a multifaceted, angular shape, but they may be ground or rolled to produce more spherical particles. Preferably, however, the proppant particulates will be more or less spherical. Spherical particles will tend to bridge a fracture at a more predictable width, thus tending to provide more predictable ingress into a fracture network. The particles also may be rigid or somewhat deformable.

The novel proppant particulates, as discussed further below, will be somewhat larger than the dissolvable particulates. Preferably, they sized from about 20 to about 100 mesh (roughly corresponding to a particle size of from about 0.84 to about 0.15 mm), and more preferably, from about 30 to about 80 mesh (roughly corresponding to a particle size of from about 0.6 to about 0.18 mm). As with the dissolvable particulates, the proppant particulates may have a more or less uniform size, a mixture of a relatively small number of particle sizes, or they may comprise a distribution of many different sizes. Inevitably, commercially available products will contain a small percentage of particles that are out of specification.

Workers in the art, with the benefit of this disclosure, will recognize the appropriate type, size, and amount of proppant particulates to use in conjunction with the well treatment fluids of the present disclosure, so as to achieve a desired result.

Diverter Material

The diverter material of the novel frac fluids will comprise a mixture of dissolvable particulates and proppant. The ratio of dissolvable particulates can vary depending on a desired application. In general, the weight ratio of dissolvable particulates to proppant (DP:P) will be from about 90:10 to about 10:90. Preferably, it will be from about 80:20 to about 20:80, and more preferably from about 60:40 to about 40:60. When the diverter material is intended to plug fractures at or near their tips, somewhat less proppant may be included in the mixture. If the diverter is intended to form plugs in secondary and tertiary fractures or otherwise away from the well bore but remote from the tips, more proppant may be required to ensure conductivity into the primary fractures once the plug dissolves.

The loading of diverter material also can vary depending on the viscosity of the carrier fluid and the quantity of proppant that will be delivered into the fractures. Heavier loadings in general may be possible for more viscous carrier fluids, while lower loadings may be preferably for lower viscosity fluids. The loading also will vary depending on the diverter material used, including the size and density of the dissolvable particulates and proppant as well as the ratio of those components. With some proppants, for example, relatively low loadings designed to form "sub-monolayer" proppant beds may be used. With that in mind, diverter material typically will be added to the carrier fluid in amounts from about 0.1 to about 10 pounds per gallon of carrier fluid (ppa). Preferably, it will be added in amounts from about 0.2 to 5 ppa, and more preferably from about 0.5 to 2 ppa.

Importantly, the particle size and specific gravity of the dissolvable particulates and proppant preferably will be coordinated to provide improved transportability in low viscosity, slickwater fluids. The dissolvable particulates preferably will be smaller than the proppant particles. The proppant particulates will be sufficiently large so that they cannot by themselves establish a plug, since they must ensure conductivity through the fracture once the dissolvable particulates have dissolved. The proppant particulates, however, will initially bridge a fracture allowing the smaller dissolvable particulates to fill in and establish a plug. With that in mind, the ratio of the maximum particle size of the proppant to that of the dissolvable particulates will be from about 1.5 to about 8, and more preferably, from about 2 to about 6.

The proppant particles, however, preferably will be less dense than the dissolvable particles. Other factors being equal, the larger proppant particles would tend to settle faster than the smaller dissolvable particles. By making them less dense, however, the difference in settling rates is reduced. More importantly, that will diminish separation of proppant and dissolvable particulates as they are transported into the fractures. There is an increased likelihood of that quantities of both particulates will reach and establish a plug at the tip of the fracture. At the same time, that will help ensure that any plugs formed before a target location is reached will have sufficient proppant to ensure conductivity once the plug deteriorates. With that in mind, the ratio of the specific gravity of the dissolvable particulates to that of the proppant preferably may be from about 1 to about 1.6, or more preferably, from about 1 to about 1.3.

It will be appreciated that the optimal mix, size, and densities of the diverter material as well as its loading will vary from well to well and according to the fracturing protocol. Such optimization, however, may be determined by routine testing.

Additives

The subject invention is believed to provide significant advantages in providing far field diversion in slickwater fluids primarily through the use of the novel diverting materials. The novel fluids, however, may be used to fracture many different formations presenting a wide variety of conditions. Thus, certain embodiments of the novel fluids may comprise additives designed to enhance the performance of the fluids in other ways as may be required or desirable under specific conditions. Many such additives are known to workers in the art, and are commercially available from a number of sources. They commonly are water soluble, and thus often are sold as liquid solutions that may be added easily to the base fluid. In general, conventional additives may be used in the novel fluids provided they are compatible with the other components.

Biocides, for example, are a common additive. Water used for fracturing often comes from rivers, lakes, and other surface water sources or from water recovered from well operations. Those water sources often contain bacteria that produce various compounds that can corrode equipment, impair fluid flow, or diminish the quality of produced fluids. Examples of common biocides include glutaraldehyde, tetrakishydroxymethyl phosphonium sulfate (THPS), tetrahydro-3,5-dimethyl-2H-1,3,5-thiadiazine-2-thione (Dazomet), and quaternary surfactants such as didecyldimethylammonium chloride, or mixtures of these biocides.

Many formations, such as shale and clay formations, tend to swell when exposed to water. Such swelling is a particular concern during drilling, but it also can cause problems during fracturing operations if the fluid is water-based. The swelling tends to cause the formation to deteriorate, which in turn can increase the viscosity of the fluid and make it more difficult to pump or to flow back once fracturing is completed. Particles sloughing off fracture walls also can clog the proppant pack. Thus, clay inhibitors often are added to slickwater fluids to minimize the tendency of shales and clays to absorb water. The most common clay stabilizer is potassium chloride. It typically is added in amounts from 2 to 5 wt % of the fluid. Other inhibitors include lower loadings of mono-quaternary ammonium salts. Clay and shale stabilizers also may be added. Typically, they are polymers, such as polyacrylamide polyacrylates copolymers, that will form a film or encapsulate water sensitive formations and minimize interactions with water.

Water used in formulating slickwater fluids often has a significantly different profile of dissolved solids than water already present in a formation. Such differences can cause a buildup in inorganic scale in the formation or in a proppant pack that can interfere with the flow of production fluids. Thus, scale inhibitors, such as polyacrylates and polyphosphates or phosphonates, often are added to slickwater fluids. Scale dissolvers also may be added to remove scale, such as may be present when an older well is refractured.

Other common additives include suspending/anti-settling agents, stabilizers, chelators/sequestrants, non-emulsifiers, fluid loss additives, buffering agents, weighting agents, wetting agents, lubricants, anti-oxidants, pH control agents, oxygen scavengers, surfactants, fines stabilizers, metal chelators, metal complexors, antioxidants, polymer stabilizers, freezing point depressants, corrosion inhibitors, wax inhibitors, asphaltene precipitation inhibitors, leak-off control agents, permeability modifiers, gases, and foaming agents and combinations thereof, provided the optionally-included additives do not adversely react with or affect the other components of the fluids. It is generally expected that additives of the type used in aqueous, slickwater fracturing fluids may be used to advantage in the novel fluids, and the desirability and compatibility of such conventional additives may be determined by routine experimentation.

Making and Using the Novel Fluids

Typical components and their concentrations in the novel fluids are described above. The choice of particular components among those generally suitable for use in the novel fluids and the amounts thereof, however, will depend on the precise chemical and physical properties of the fluid that are needed for a particular fracturing operation. Cost considerations also may come into play. Workers in the art may optimize the precise formulation of the novel fluids for a particular application by reference to principles well known in the art and by routine experimentation.

Moreover, it will be appreciated that various functions and mechanisms have been ascribed to each component of the novel fluids and to their effect of the overall properties of the fluid. While such explanations are believed to be accurate and are believed to provide useful guidance in making and using the novel fluids, it will be understood that the invention is not limited thereby. As demonstrated by the examples that follow, regardless of their respective individual properties, the mechanism by which they function, or their effectiveness in other fluids, the novel diverter materials are believed to provide improved performance in slickwater fluids.

In particular, the novel fluids should be able to transport diverter material more effectively into fractures with less settling and with reduced separation of dissolvable particulates and proppants despite the relatively low viscosity of slickwater fluids. When the particle sizes of the diverter components are coordinated with each other and the anticipated fracture width, the novel fluids can provide improved diversion at the tips of fractures. Moreover, in the event that the diverter material is not transported to or near the fracture tip and forms a plug remote therefrom, once the dissolvable particulates have dissolved, the proppant will provide conductivity through the fracture.

It also will be appreciated that by improving the efficiency with which diverter material may be carried into the fracture tips and other far field locations, the fracture network may be more carefully controlled and engineered. Frac hits may be minimized and fluid diverted to more productive portions of a reservoir. The complexity of the fracture pattern may be improved with more secondary, tertiary, and higher order branching. Production may be increased without necessarily increasing the volume of frac fluid required or the associated operational costs.

In general, the novel fracturing fluids may be made and circulated by methods and equipment well known and used by workers in the art. For example, an aqueous base fluid typically will be stored on site in tanks. Similarly, sand tanks may be used to store proppant on site. The friction reducer, surfactant, and other additives typically will be transported on site by a chemical unit. A hydration unit may be used to blend the friction reducer and other liquid additives into the aqueous base fluid to produce a carrier fluid. A dry blender may be provided on site to mix the diverter and proppant particulates, or they may be mixed off site. An on-site blender typically will be used to mix the particulates into the carrier fluid, typically on the fly. An array of hydraulic pumps may be used to pressurize the fluid and to discharge it into a frac manifold which is connected to the well head by various conduits commonly referred to as frac iron. Recovery tanks typically will be used to recover the fracturing fluid for treatment, reconstitution, or disposal.

While the sequence of operations can vary, a carrier fluid first may be prepared by adding friction reducers, surfactants, and other desired liquid additive to an aqueous base fluid. Depending on the friction reducer, a period of time may be required to allow the friction reducer to hydrolyze. Alternately, a pre-hydrolyzed solution of friction reducer may be used. An initial pad of carrier fluid may be pumped into the well to initiate fracturing. The diverter material then may be added as pumping continues, the objective being to plug the initial, primary fractures near their tip. That can be followed by the addition of proppant alone to support the plugged fractures.

Beyond just controlling fracture length, far-field diverters can also be designed to be pumped in the middle of a stage to control growth of secondary/tertiary fractures and thereby to allow redistribution of fracturing fluid within the rock to further increase complexity. Many, if not most such secondary fractures are created in the far field. Thus, for example, after an initial pad with diverter and a pad with proppant alone, additional quantities of diverter material may be added to the fluid being pumped into the formation. The particulates will be sized to plug existing, more receptive secondary and tertiary fractures and induce additional fracture complexity.

The fluids may be prepared in batches, or they may be prepared or supplemented on the fly. Pumping rates and quantities of fluid pumped also can vary considerably depending on the particular fluid and formation to be fractured. As an example, however, it is expected that shale formations typically may be fractured by pumping from about 8,000 to about 14,000 barrels of the novel fluid at rates from about 60 to about 100 bbl/min.

Also, while the novel fluids have been described for use in fracturing formations, it will be appreciated that they also may be used to advantage in various completion or workover operations as are typically performed to enhance production from a hydrocarbon well. For example, the novel fluids may be used to divert the flow of acidizing fluids.

EXAMPLES

The invention and its advantages may be further understood by reference to the following examples. It will be appreciated, however, that the invention is not limited thereto.

Examples

Materials and Preparation of Test Fluids

Test fluids for the examples that followed were prepared using the following components:

Base fluid—Tomball tap water.

Friction Reducer—ThinFrac™ MP, an anionic liquid formulation comprising a high-viscosity yielding polyacrylamide polymer commercially available from BJ Services, LLC, Tomball, Tex. (bjservices.com).

Surfactant 1—NE-530 surfactant, a non-emulsifying, nonionic surfactant commercially available from BJ Services.

Surfactant 2—FloSurf RDM surfactant, a nonionic, microemulsion surfactant commercially available from Finoric, LLC, Houston, Tex. (finoric.com), Surfactant 3—NanoCRS surfactant, a multifunctional surfactant blend enhanced with nano-scale particles commercially available from Chem EOR, Inc. Corvina, Calif. (chemeor.com).

Dissolvable Particulate 1—polylactic acid having a particle size of 100 mesh and a specific gravity of 1.2 commercially available from A. Schulman, Inc., Fairlawn, Ohio (aschulman.com).

Dissolvable Particulate 2—an inorganic particulate having a specific gravity of 2.5 commercially available from A. Schulman.

Sand—100 mesh sand commercially available from Unimin Corporation, New Canaan, Conn. (uninim.com).

Proppant—Lite-Prop™ 108, an ultra-lightweight, thermoset nanocomposite bead with dispersed nanofillers having a specific gravity of 1.054 and a 30/80 mesh size, commercially available from BJ Services.

Preparation of Test Fluids. Test fluids were prepared by first preparing a carrier fluid. The carrier fluid was prepared by adding 2 ml of friction reducer to 1 liter of tap water, allowing it to hydrate for 3 minutes, and then adding the surfactant. The dissolvable particulates and proppant particulates were pre-blended to provide the diverter material. The diverter material then was added to the carrier fluid. The resulting test fluid was blended with vigorous overhead mixing (1,000 rpm) until no clumps were visible (about 1 minute).

Various test fluids were prepared using the same carrier fluid as described above except that for some fluids the surfactant was different. The test fluids otherwise differed in the particulates added to the carrier fluid. The viscosity of the carrier fluid for the test fluids was determined as set forth in Example 1 below. The components and loadings for each test fluid (Fluid Nos. 1-12) are set forth in the table of FIG. 2. The size (US mesh) and specific gravity (SG) are reported for each particulate in the test fluids. Component loadings are reported in dissolvable particulate to proppant weight ratio (DP:P), pounds of diverter added per gallon of base fluid (ppa), and gallons added per thousand gallons of base fluid (gpt).

Example 1

Viscosity of Test Fluids

The viscosity of the carrier fluid for the test fluids was estimated using a Model 900 Ofite coaxial cylinder rotational oilfield viscometer sold by OFI Testing Equipment, Inc., Houston, Tex. The viscometer is a rotational coaxial cylinder viscometer using a rotating rotor and a stationary bob. Fluid is placed in a beaker, and the beaker is elevated to immerse the rotor and bob in the fluid. The rotor then is rotated and torque on the bob is measured.

The rotor was an Ofite R1 rotor having a radius of 1.8415 cm. The bob was an Ofite B1 bob having a radius of 1.7245 cm and a height of 3.8 cm. Test procedures and data acquisition are controlled by a computer running Ofite Orcada software. The viscometer was calibrated prior to testing using silicone oil having a viscosity of 20 cP obtained from OFI Testing Equipment according to the manufacture's standard calibration procedures.

Approximately 200 ml of carrier fluid (without surfactant) was added to the cup, filling the cup to a level approximately 2-3 inches above the top of the rotor and bob. Fluids were added and tested at room temperature. The fluids were subjected to high shear rates (511 rps) for a short period of time until the viscosity readings stabilized. The viscosity then was recorded. It will be noted that the high shear rates may be generally correlated to conditions experienced by fluids being pumped down a liner.

The viscosity of the carrier fluid without surfactant was measured to be approximately 7.5 cP. It is believed that the addition of the various surfactants used will not have significantly affected that viscosity.

Example 2

Slot Plugging

The performance of Test Fluid 1 and 2 in subterranean fractures was modeled assuming a fracture tip width of 0.5 mm. Test Fluid 1, as may be seen in the table of FIG. 2, had a diverter mix consisting of 100 mesh dissolvable polylactic acid (PLS) particulates (1.2 specific gravity) and 30/80 mesh Lite-Prop 108 proppant (1.054 specific gravity) in a 40:60 DP:P weight ratio. Test Fluid 2 used the same diverter mix and was otherwise identical to Test Fluid 1 except that it had a higher loading of diverter mix: 2 ppg vs 0.5 ppg.

The testing used a custom apparatus that allowed direct observation of slurry flowing into a slot. The slot apparatus included a clear, polycarbonate tube. The tube was 12" long and had an inner diameter of 0.75". A slot was created within the tube by installing a pair of spaced, clear plastic blocks. The blocks had a near semi-cylindrical shape. Their external circumference closely fitted within the inner circumference of the tube. The blocks were installed such that their faces were substantially parallel and spaced from each other.

The blocks were 5" long, thus creating a slot that was approximately 0.75" high and 5" long. The spacing between the blocks was varied to create slots of varying widths selected to match expected fracture widths. It will be noted that the blocks were configured in some tests to provide a tapered entrance to the slot. The taper was not uniform across all tests, but it is believed that such differences did not materially affect the results observed.

A Model 260D syringe pump sold by Teledyne Isco, Lincoln, Nebr. (teledyneisco.com) was used to pump fluid from a tank into the slot apparatus. The outlet of the pump was connected to a hydraulic accumulator. The hydraulic accumulator was connected to the slot apparatus by ¾" metal piping.

Testing was initiated by filling the ¾" piping with test fluid. Carrier fluid then was pumped through the accumulator to drive the test fluid into the slot apparatus. Fluid was pumped at the maximum flow rate for the pump: 200 ml/min. That is within the range of expected fluid velocities at a 0.5 mm frac tip (400 ml/min) assuming a pump rate of 80 barrels/minute into 5 bi-wing fractures with a height of 100 feet. Pressure was limited to 300 psi to stay within the pressure rating of the polycarbonate tube (400 psi).

The test fluids were flowed through slots of three different widths: 0.5 mm, 0.75 mm, and 1.0 mm. Hydraulic pressure within the apparatus was monitored. Flow was observed visually for indications of bridging and plugging. Hydraulic pressure within the apparatus also was monitored for indications of plugging.

Slot=0.5 mm. The diverter material in both test fluids rapidly formed a plug at the entrance of the 0.5 mm slot. A diverter pack began accumulating in the tube above the plug. The hydraulic pressure within the tube rapidly spiked to 300 psi, and thus testing was ended.

Slot=0.75 mm. No plug was formed when Test Fluid 1 (0.5 ppg loading) was flowed through the 0.75 mm slot. The diverter material in Test Fluid 2 (2 ppg loading), however, formed a plug at the entrance of the 0.75 mm slot, although it took more time for the plug to develop than in the 0.5 mm slot. Testing was ended when pressure in the tube reached 300 psi.

Slot=1 mm. No bridging or pressure increase was noted when either test fluid was flowed through the 1.0 mm slot. The entrained diverter material flowed easily through the slot.

While bridging and plugging of fractures will depend on fluid velocity through and surface characteristics of a fracture, this testing shows that the novel fluid is capable of plugging fracture tips while avoiding premature plugging remote from the tip.

Example 3

Pack Permeability

It will be noted that testing of a 0.5 mm slot reported in Example 1 had to be concluded at 300 psi due to the pressure rating of the polycarbonate tube. Thus, additional testing was done to better quantify the plugging performance of Test Fluid 2 observed in the 0.5 mm slot as well as the performance of other novel diverter materials.

Specifically, the permeability of the plugs formed by Test Fluids 2 to 7 were measured. It will be noted that the test fluids all contained the same dissolvable particulates and proppant. The size of the dissolvable particulates and the ratio of dissolvable particulate to proppant (DP:P), however, was varied. A 40:60 diverter material was evaluated with 100, 70, and 50 mesh dissolvable particulates (Test Fluids 2 to 4). Diverter material having 100 mesh dissolvable particulates were evaluated at ratios of 20:80, 40:60, 60:40, and 100:00 (Test Fluids 5, 2, 6, and 7).

A steel screen was placed in the ¾" metal piping leading to the polycarbonate tube with the 0.5 mm slot. The test fluid was flowed until a plug was formed. Flow through the polycarbonate tube was observed to confirm that no diverter material passed through the screen. Water then was flowed through the plug at the rate of 40 mL/min for 10 minutes (approximately 400 times the estimated pore volume of the plug) to flush out friction reducer entrained in the particulates. Pressure above (upstream of) the plug then was recorded. Pressure above the plug then was measured at various other flow rates.

The change in pressure was plotted as a function of flow rate, and the permeability of the pack was calculated using the slope of the linear digression. Permeability was calculated based on Darcy's law using the formula:

$$K \text{ (permeability)} = \{(14{,}700 \, \mu L)/(\Delta PA)\}Q$$

where K is permeability in millidarcys (mD), $\mu$ is the viscosity in centipoise (cP), L is the sample length in centimeters (cm), $\Delta P$ is differential pressure in psi, A is the area of the cylinder ends in square centimeters (cm$^2$), and Q is flow rate in cubic centimeters per second (cc/sec). The constant of 14,700 is used in the formula to convert the units from atmospheres (atm) to psi and darcys (D) to millidarcys.

The permeability (mD) (millidarcys) of Fluids 2 to 7 is shown below in Table 1, which also tabulates the particle size of the dissolvable particulates (DP Size) in US mesh sizes, the mesh size of the proppant (Prop Size), and the weight ratio of dissolvable particulates to proppant (DP:P).

TABLE 1

| Test Fluid | DP Size (mesh) | Prop Size (mesh) | DP:P (by weight) | Permeability (mD) |
|---|---|---|---|---|
| 2 | 100 | 30/80 | 40:60 | 230 |
| 3 | 70 | 30/80 | 40:60 | 1,500 |
| 4 | 50 | 30/80 | 40:60 | 3,100 |
| 5 | 100 | 30/80 | 20:80 | 660 |
| 6 | 100 | 30/80 | 60:40 | 200 |
| 7 | 100 | 30/80 | 100:0 | 90 |

It will be noted that the diverter material having the smallest size dissolvable particulate (100 mesh) had the lowest permeability. Interestingly, it appears that relatively small differences in the size of the dissolvable particulates in the diverter mix had a profound effect on the permeability of the plug. The permeability of the plugs with a 40:60 ratio mix increased significantly as the size of the dissolvable particles was increased from 100 mesh to 70 mesh and then to 50 mesh. Cf. Test Fluids 2 to 4. The permeability of the plugs having 100 mesh dissolvable particulates increased as the amount of proppant in the diverter mix was increased. Cf. Test Fluids 2 and 5 to 7. It also will be noted that while little or no diverter material passed through the screen for the test fluids having proppant (Test Fluids 2 to 6), when there was no proppant (Test Fluid 7) the dissolvable particulates tended to work through the screen and to flow freely through the 0.5 mm slot.

Interestingly, a pressure spike was observed while the plug was forming and before all the friction reducer was flushed. That suggests that the carrier fluid, despite its relatively low viscosity, is helping create pressure behind the plug and will aid in diversion performance.

Example 4

Slot Flow

The transportability of Test Fluid 1 was evaluated by flowing the fluid through a larger scale slot. The slot ⅝" wide, 1 ft high, and 2 ft long. Larger scale slot flow testing was carried out in an in-house built slot model with dimensions of ⅝ inch width, 1 ft height, and 2 ft length. The slot had a single inlet in the upper portion of one end and two outlets at the other end of the slot. The slot was fabricated from polycarbonate sheets so that flow through the slot could be visually observed.

Test Fluid 1 was flowed through the slot at a rate of 1 L/min for a period of time and the movement of diverter material through the slot was observed. While flow through the slot was somewhat non-uniform due to the relatively short length of the slot, no settling of the diverter material was observed. The diverter material had a very uniform distribution at the end of testing.

Test Fluid 8, which was loaded with conventional 100 mesh sand instead of a novel diverter material, was also tested to evaluate its transport capability. One hundred mesh sand is commonly used as a proppant with slickwater fluids and likely has some tendency to form plugs that could divert fluid. Test Fluid 8 utilized the same carrier fluid as Test Fluid 1 evaluated above. Test procedures also were the same except that a mixer was used in the supply tank to prevent premature settling of the sand in Test Fluid 8.

By the end of the test sand banks were clearly seen developing in the bottom portion of the slot.

Example 5

Static Settling

The stability of Test Fluids 2, 8, 11, and 12 were evaluated under static conditions. As may be seen in the table of FIG. 2, the test fluids differed in their particulates and loading. Test Fluids 2 and 11 both had a diverter mix consisting of 100 mesh dissolvable particulates (1.2 specific gravity) and 30/80 mesh proppant (1.054 specific gravity) in a 40:60 weight ratio, but differed in the loading of diverter material (2 ppa and 1 ppa). Test Fluids 8 and 12 had different loading of 100 mesh sand (2 ppa and 4.7 ppa).

About 200 mL of the test fluids were prepared and placed immediately in a 250 mL graduated cylinder. (Due to the differences in density, the volume loading of Test Fluids 2 and 12 were the same, but the volume loading of Test Fluid 11 was slightly higher than Test Fluid 8.) The stability of the fluids then was observed visually.

Test Fluids 8 and 12, which contain sand, showed rapid settling within 5 minutes, confirming the poor transport characteristics of this commonly used material in slickwater fluids. In contrast, Test Fluids 2 and 11 showed much slower settling. Test Fluid 2 settled to about 50% of the final settled volume at around 3 hours. Test Fluid 11 settled to about 50% of the final settled volume at around 1 hour.

It is believed that those tests show that the novel diverter material can be expected to have much improved transportability, even in less viscous fluids such as slickwater, than does commonly used sand. It will be noted that settling tests conducted under static conditions are much harsher than conditions in the field where, in the normal case, the fluid will be under dynamic conditions (flowing).

The stability of the Test Fluid 2 under static conditions also was compared to the static stability of Test Fluids 9 and 10. As may be seen in the table of FIG. 2, those test fluids were identical except for the surfactant used. All test fluids had a 2 ppa loading of diverter mix consisting of 100 mesh dissolvable particulates (1.2 specific gravity) and 30/80 mesh proppant (1.054 specific gravity) in a 40:60 weight ratio.

About one hundred mL of the test fluids were prepared as stated previously and transferred immediately to a 250 mL graduated cylinder. The stability of the fluids then was observed visually.

Both Test Fluids 2 and 10, which incorporated surfactants 1 and 3, respectively demonstrated even dispersion of proppant and dissolvable particulates over time. Even dispersion of particulates a diverter mix is preferable as it tends to provide more uniform transport and more predictable placement of particulates.

On the other hand, Test Fluid 9, which used surfactant 2, showed agglomeration and clumping of the dissolvable particulate and separation of the dissolvable particulate from the proppant. Test fluids with no surfactant also showed similar agglomeration and phase separation. Thus, the testing shows that an appropriately selected surfactant preferably will be used with this embodiment of the novel diverter material. It is expected as well that the need for and selection of an optimal surfactant may vary depending on the particular diverter material used. Selection of suitable surfactants is made more difficult because commercially available surfactants are invariably sold as proprietary blends, making the exact composition difficult to ascertain. It is believed, however, that an appropriate surfactant may be selected with routine experimentation, such as the testing outlined in this Example 5.

Example 6

Conductivity

Conductivity and permeability of proppant beds formed from a diverter mix and of the proppant alone were measured. The diverter mix had the same proppant (Lite-Prop 108) as in the diverter mix of the test fluids, but an inorganic dissolvable particulate was substituted for the polylactic acid used in the diverter mix of the test fluids. Polylactic acid has a degradation time of at least 2 weeks at 150° F. The inorganic dissolvable particulate was used because it dissolves more easily that PLA. It can be dissolved by flowing water through it for a day or two. The proppant only particulate consisted of Lite-Prop 108 proppant only. It did not contain dissolvable particulates.

The tests were conducted in accordance with International Standard ISO 13503-5, *"Procedures for Measuring the Long-Term Conductivity of Proppants,"* except that the tests were shortened to 3 hours at each closure pressure. The test particulates were loaded into the conductivity apparatus to depths of 1.4 mm (diverter mix) and 0.8 mm (proppant only).

The composition and loading of particulates in the bed are set forth below in Table 2.

TABLE 2

| Pack | DP | DP SG | Prop. | Prop. Size (mesh) | Prop. SG | DP:P (wt) | Loading (lb/ft$^2$) |
|---|---|---|---|---|---|---|---|
| Div. | Inorganic | 2.5 | LiteProp 108 | 30/80 | 1.054 | 57:43 | 0.22 |
| Prop. | — | — | LiteProp 108 | 30/80 | 1.054 | 0:100 | 0.13 |

Conductivity, as well as permeability, then was measured at 150° F. and up to 4000 psi closure strength. In the case of the diverter mix, fluid was flowed through the plug for a period of time to remove all dissolvable particulates before data was recorded.

Figure 3:
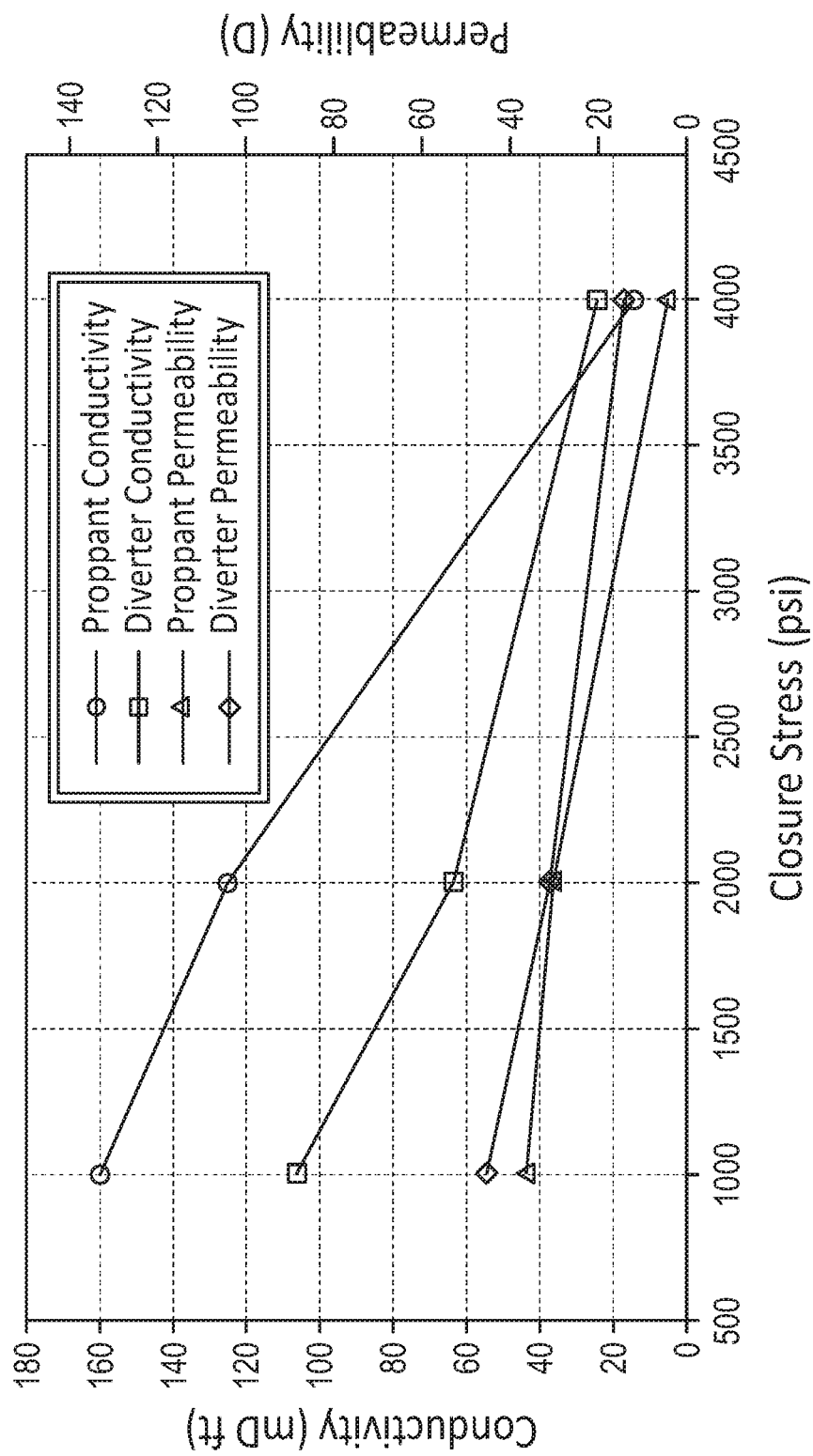
FIG. 3 is a graphical presentation of the conductivity (mD ft) and permeability (D) of different proppant packs as a function of closure stress (psi) as tested in Example 6.

A graph showing the conductivity (mD ft) and permeability (D) of proppant placed by the diverter mix ("Diverter") and the proppant only ("Proppant") as a function of closure stress (psi) is presented as FIG. 3.

As expected, the conductivity and permeability of the proppant pack from both particulates decreased with increased closure stress. Because of the differences in plug depth, however, it is difficult to directly compare the conductivity and permeability data for the proppant packs for the two test particulates. It will be noted, however, that the proppant packs from the diverter mix appears to have better conductivity and permeability than the proppant pack established with proppant only. It may be that the dissolvable material in the diverter material may be creating large gaps in the proppant that remain at least partially intact after the dissolvable particulates have dissolved. In any event, the proppant packs from both test fluids had significantly better conductivity and permeability than packs formed by low loadings of 100 mesh sand and finer sands as are commonly used in slickwater fluids.

The foregoing examples demonstrate that the novel diverter materials allow for more efficient and effective transport into far field fractures even in slickwater fluids. It is anticipated, therefore, that the novel fluids will allow for more efficient, more cost-effective fracturing operations.

While this invention has been disclosed and discussed primarily in terms of specific embodiments thereof, it is not intended to be limited thereto. Other modifications and embodiments will be apparent to the worker in the art.

What is claimed is:

1. An aqueous well treatment fluid, said well treatment fluid comprising:
   (a) water;
   (b) a friction reducer;
   (c) a diverter, said diverter comprising:
   i) dissolvable particulates having a specific gravity of from about 0.9 to about 1.6, the dissolvable particulates consisting essentially of dissolvable particulates having a particle size of about 100 mesh or less; and
   ii) proppants having a specific gravity of from about 0.9 to about 1.4, the proppants consisting essentially of proppants having a particle size of from about 20 to about 100 mesh; and
   iii) wherein said dissolvable particulates have a higher specific gravity and a smaller particle size than said proppants.

2. The fluid of claim 1, where the ratio of said specific gravity of said dissolvable particulates to said specific gravity of said proppant is from greater than 1 to about 1.6.

3. The fluid of claim 1, where the ratio of said specific gravity of said dissolvable particulates to said specific gravity of said proppant is from about greater than 1 to about 1.3.

4. The fluid of claim 1, wherein said fluid has a viscosity of about 12 cps or less.

5. The fluid of claim 1, wherein said fluid has a viscosity of about 8 cps or less.

6. The fluid of claim 1, wherein the ratio of the maximum particle size of said proppant to that of said dissolvable particulates is from about 1.5 to about 8.

7. The fluid of claim 1, wherein the ratio of the maximum particle size of said proppant to that of said dissolvable particulates is from about 2 to about 6.

8. The fluid of claim 1, wherein said dissolvable particulates have a specific gravity of from about 1 to about 1.4.

9. The fluid of claim 1, wherein said dissolvable particulates have a specific gravity of from about 1.2 to about 1.3.

10. The fluid of claim 1, wherein said dissolvable particulates are composed of polylactic acid.

11. The fluid of claim 1, wherein said proppant particulates have a specific gravity of from about 1 to about 1.1 and a particle size of from about 30 mesh to about 80 mesh.

12. The fluid of claim 1, wherein said proppants are thermoset polymer beads having nanofillers.

13. The fluid of claim 1, wherein the loading of said diverter is from about 0.1 to about 10 ppa.

14. The fluid of claim 1, wherein the loading of said diverter is from about 0.2 to about 5 ppa.

15. The fluid of claim 1, wherein the loading of said diverter is from about 0.5 to about 2 ppa.

16. The fluid of claim 1, wherein the ratio of said dissolvable particulates to said proppants by weight is from about 80:20 to about 20:80.

17. The fluid of claim 1, wherein the ratio of said dissolvable particulates to said proppants by weight is from about 60:40 to about 40:60.

18. The fluid of claim 1, wherein said friction reducer is selected from the group consisting of polyacrylamides and derivatives, copolymers, and mixtures thereof.

19. The fluid of claim 1, wherein said fluid comprises a surfactant.

20. A method of enhancing production from a subterranean formation in a well, said method comprising:

(a) providing the fluid of claim 1; and
(b) pumping said fluid into said formation.

21. The method of claim 20, wherein said method is a method of fracturing said formation.

22. A method of enhancing production from a subterranean formation in a well, said method comprising:

(a) providing an aqueous carrier fluid;
(b) adding a diverter to said carrier fluid, said diverter comprising:
  i) dissolvable particulates having a specific gravity of from about 0.9 to about 1.6, the dissolvable particulates consisting essentially of dissolvable particulates having a particle size of about 100 mesh or less; and
  ii) proppants having) a specific gravity of from about 0.9 to about 1.4, the proppants consisting essentially of proppants having a particle size of from about 20 mesh to about 100 mesh; and
  iii) wherein said dissolvable particulates have a higher specific gravity and a smaller particle size than said proppants proppant; and
(c) pumping said carrier fluid with said diverter into said formation.

* * * * *